United States Patent
Kumar

(10) Patent No.: US 7,126,293 B1
(45) Date of Patent: Oct. 24, 2006

(54) WHEEL SLIP CORRECTION SYSTEM

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/157,732

(22) Filed: Jun. 21, 2005

(51) Int. Cl.
  *B61C 15/08* (2006.01)
  *B61C 15/12* (2006.01)
  *B60K 28/16* (2006.01)

(52) U.S. Cl. .................. 318/52; 318/79; 318/144; 180/197

(58) Field of Classification Search .................. 318/52, 318/79, 144, 66, 71, 376; 105/49, 61; 303/139; 180/197
See application file for complete search history.

(56) References Cited

U.S. PATENT DOCUMENTS

| | | | | |
|---|---|---|---|---|
| 3,737,745 A | * | 6/1973 | Chevaugeon et al. | 318/52 |
| 3,764,867 A | * | 10/1973 | Smith | 318/52 |
| 3,898,937 A | * | 8/1975 | Johnson | 318/52 |
| 3,930,189 A | * | 12/1975 | Smith | 318/52 |
| 4,071,282 A | * | 1/1978 | Callahan et al. | 303/168 |
| 4,134,048 A | * | 1/1979 | Schneider | 318/52 |
| 6,634,303 B1 | | 10/2003 | Madsen et al. | |
| 6,984,946 B1 | * | 1/2006 | Donnelly et al. | 318/139 |
| 2005/0189886 A1 | * | 9/2005 | Donnelly et al. | 318/52 |
| 2005/0189887 A1 | * | 9/2005 | Donnelly et al. | 318/52 |
| 2005/0206230 A1 | * | 9/2005 | Donnelly | 303/139 |
| 2005/0264245 A1 | * | 12/2005 | Donnelly | 318/139 |

* cited by examiner

*Primary Examiner*—Lincoln Donovan
*Assistant Examiner*—Eduardo Colon Santana
(74) *Attorney, Agent, or Firm*—Carlos Luis Hanze; James H. Beusse; Beusse Wolter Sanks Mora & Maire, P.A.

(57) ABSTRACT

A wheel slip correction system for an electric traction motor propelled vehicle having a plurality of DC electric traction motors with series connected armature and field windings incorporates an apparatus connected in circuit with each motor for reducing motor armature current in response to a motor speed increase caused by wheel slip. The apparatus is arranged to be non-power dissipative during non-wheel slip conditions.

11 Claims, 6 Drawing Sheets

WHEEL SLIP CORRECTION SYSTEM

FIELD OF THE INVENTION

The present invention relates to wheel slip correction systems and, more particularly, to wheel slip correction systems for DC electric motor driven vehicles having multiple motors driving multiple wheels of the vehicle.

BACKGROUND OF THE INVENTION

Wheel slip correction systems commonly used in locomotive applications in DC electric traction motors are coupled in driving relationship to wheel/axle assemblies of the locomotive. Because the locomotive wheels are steel running on steel rails there is a high likelihood of one or more wheels slipping either from effects of load or rail conditions. Various methods have been used to overcome wheel slip and improve traction including mechanical methods, such as applying sand to a rail, and electrical methods such as by removing or decreasing electrical power to a motor driving the slipping wheel.

One method of electrically correcting for wheel slip is disclosed in U.S. Pat. No. 6,634,303. In this patent, a plurality of DC electric motors connected for driving respective wheels of a locomotive have their field windings shunted by a resistance so that at least some armature current bypasses the field winding so that the motors are normally operated in a field weakened mode. Upon detection of a wheel slip, a switch that is connected in series circuit with the resistance is opened so that full armature current is forced through the field winding of the motor associated with the slipping wheel. The increase in field current increases motor flux which in turn increase motor back EMF to thereby reduce the effective voltage at the motor armature causing a drop in motor current and a concomitant reduction in motor torque. Reduced torque allows the wheel to slow thereby correcting for the wheel slip. An obvious disadvantage of this system is the power loss in all the resistive loads connected in parallel with the field windings of each of the motors during normal operation, particularly since wheel slipping is a random, short-term event.

DETAILED DESCRIPTION OF THE INVENTION

Locomotives used for heavy haul applications and for passenger applications that are powered by DC electric traction motors are typically controlled on a whole vehicle basis. For example, a conventional diesel-electric locomotive uses a diesel engine to drive an alternator producing electric power. The alternator output is controlled to establish a desired voltage on a DC bus. All of the traction motors on the locomotive are connected to the DC bus and locomotive speed or power is controlled by varying the excitation on the DC bus so that all motors are concurrently effected. Similarly, any change in operation of one of the motors effects the operation of all other motors due to the alternator armature reaction. It is to be noted that the various embodiments disclosed herein while directed specifically to a locomotive are applicable to any vehicle having multiple driven wheels where some wheels can slip or slide with respect to others of the driven wheels. Further, since there are multiple wheels and multiple drives and controls. Terms used in the singular shall also be read to encompass the term as if it was stated in its plurality. This reasoning shall also apply in the inverse. For example, the use of the term "invention" shall be construed as also meaning the term "inventions" whereas the use of the term "inventions" shall also be construed to mean the term "invention."

Although any one motor may not produce the exact same speed or torque for a given excitation voltage, in a locomotive application where each motor is connected to a gear box coupled to a wheel/axle set, the speed of each motor is constrained by the gear ratio and associated wheel diameter. Each wheel may experience different rail interface friction or adhesion characteristics. Accordingly, in order to achieve maximum tractive effort, it is desirable to control each motor separately or at least the motors in one truck should be controlled differently from other motors or groups of motors.

Various ways of controlling individual traction motors on a vehicle using multiple motors have been developed. As an example, the motor excitation voltage may be controlled on a per motor or per truck basis by using separate phase controlled rectifiers for each motor or group of motors to produce excitation that matches the motor torque to rail adhesion.

Figure 1:
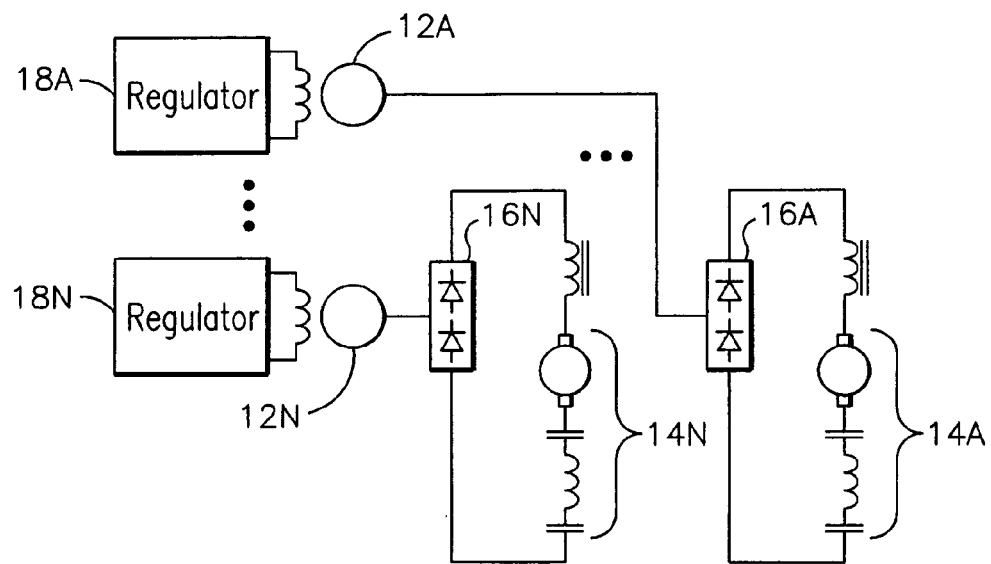
FIG. 1 is a simplified diagram of one form of individual motor control on a multi-motor propelled vehicle.

FIG. 1 is an example of an individual motor control proposed by applicant. The alternator used for electric power generation can be separated into multiple alternators 12A to 12N each supplying power to either a single traction motor 14A–14N via corresponding rectifier circuits 16A–16N or to groups of motors such as all motors on one truck. Each alternator 12A–12N is regulated separately by a corresponding regulator 18A–18N. In actual practice, a typical power alternator has multiple armature windings and multiple field controllers so that the alternators 12A–12N may be multiple armature windings on a common shaft with common housing.

Figure 2:
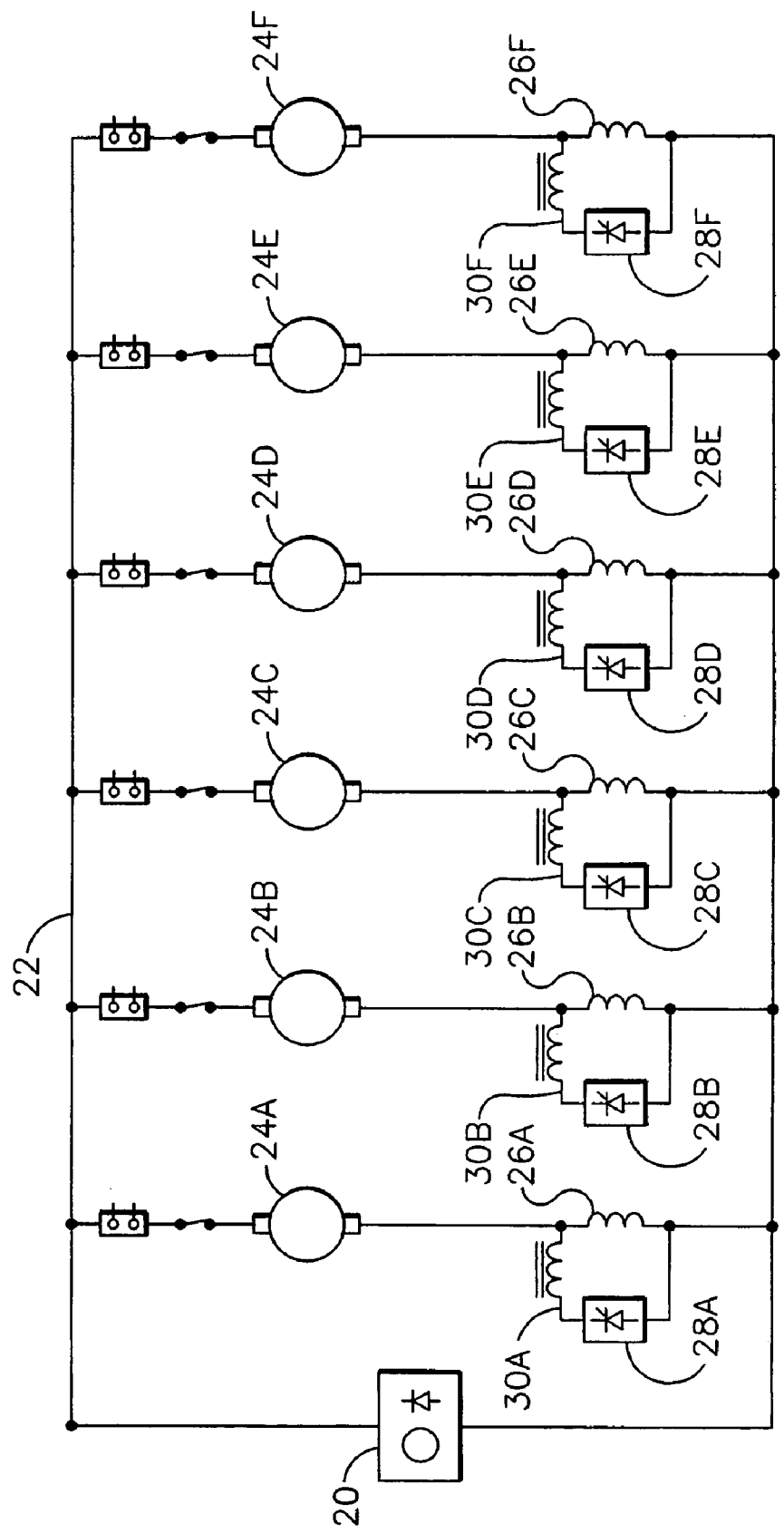
FIG. 2 is a simplified schematic representation of a motor control system for reducing torque on an individual motor basis when all motors are coupled to a common power source.

FIG. 2 illustrates another method for implementing individual motor control using a conventional excitation system in which the power alternator/rectifier 20 supplies DC electric power to a common bus 22. Each motor 14A–14F has an armature winding 24A–24F (sometimes referred to herein as simply an "armature") connected in series circuit with a corresponding field winding 26A–26F (sometimes referred to herein as simply a "field"). In this embodiment, each field winding 26 is shunted by a controllable switching device 28A–28F, such as a thyristor, that is serially connected with a field boost power source 30A–30F. The power source may be a phase-controlled rectifier powered with AC voltage from an auxiliary winding of the alternator of source 20 or a DC to DC converter powered from a separate DC source such as the locomotive's battery. It is also possible to incorporate an additional field winding (not shown) into each motor and use the boost power source to energize this winding during a wheel slip. In the system of FIG. 2, the field boost arrangement increases current through the field winding of a motor 14 driving a slipping wheel. The increased current increases motor flux causing an increase in armature back EMF that reduces the effective voltage on the armature (effective voltage is applied voltage minus the armature generated voltage or counter EMF) thereby reducing motor current and torque so that the slipping wheel can slow and regain traction. The advantage of the system of FIG. 2 is that the boost circuit is disconnected except during a wheel slip condition so that power usage is minimal.

Figure 3:
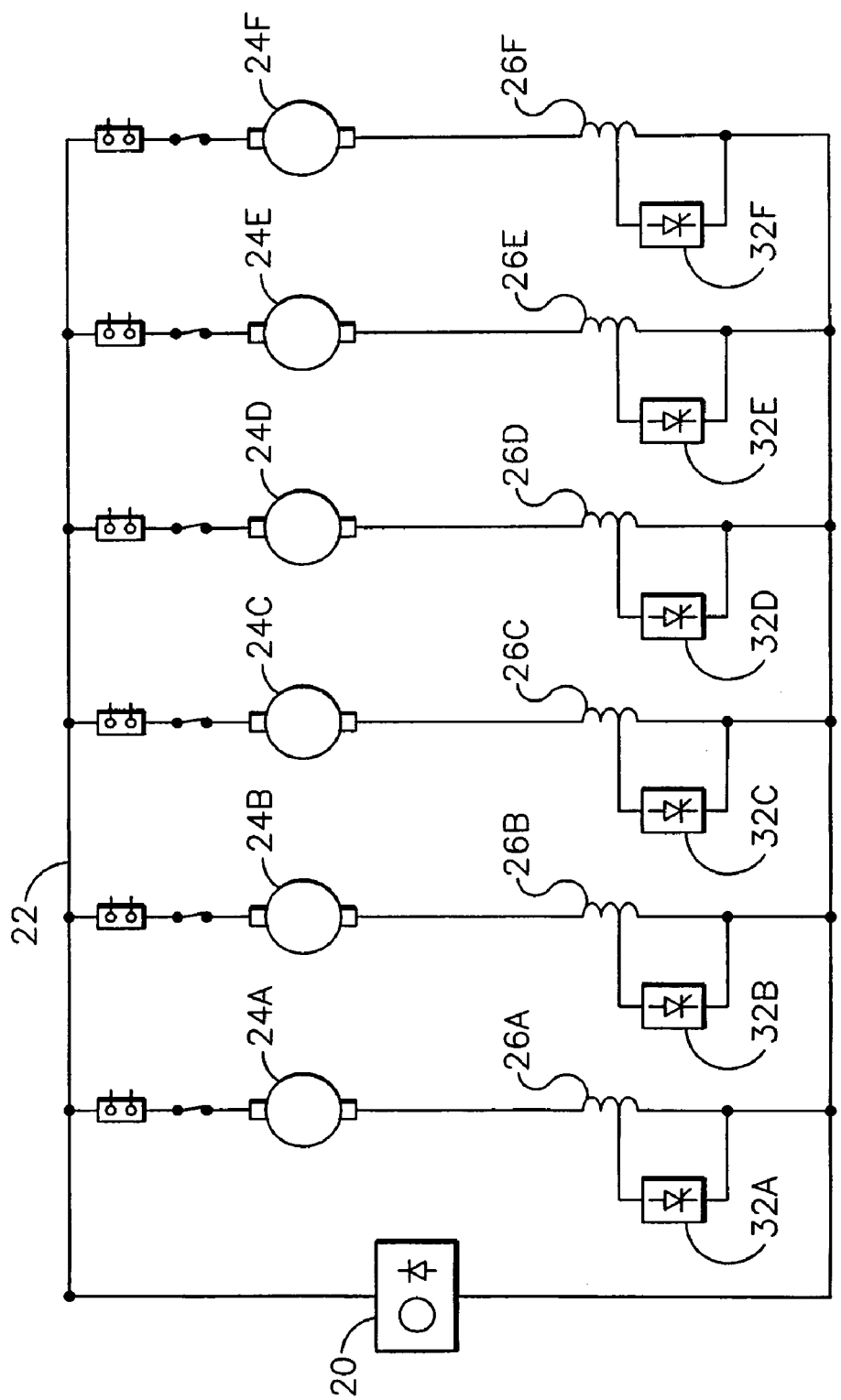
FIG. 3 is a modification of FIG. 2 using partial field shunting.

FIG. 3 illustrates another form of field boost but eliminates the need for a separate power source. In this embodiment, a small portion of the motor field windings 26A–26F are shunted by the controllable switching devices 32A–32F. Each device 32 is normally conducting. When a wheel slip is detected, the device 32 associated with the motor driving the slipping wheel is open circuited forcing the motor current to pass through the normally bypass winding section. This increases motor flux and again reduces motor torque to allow the slipping wheel to slow and regain traction. This system has the advantage of reduced power drain during normal operation since the switching devices 32 absorb little power.

Figure 4:
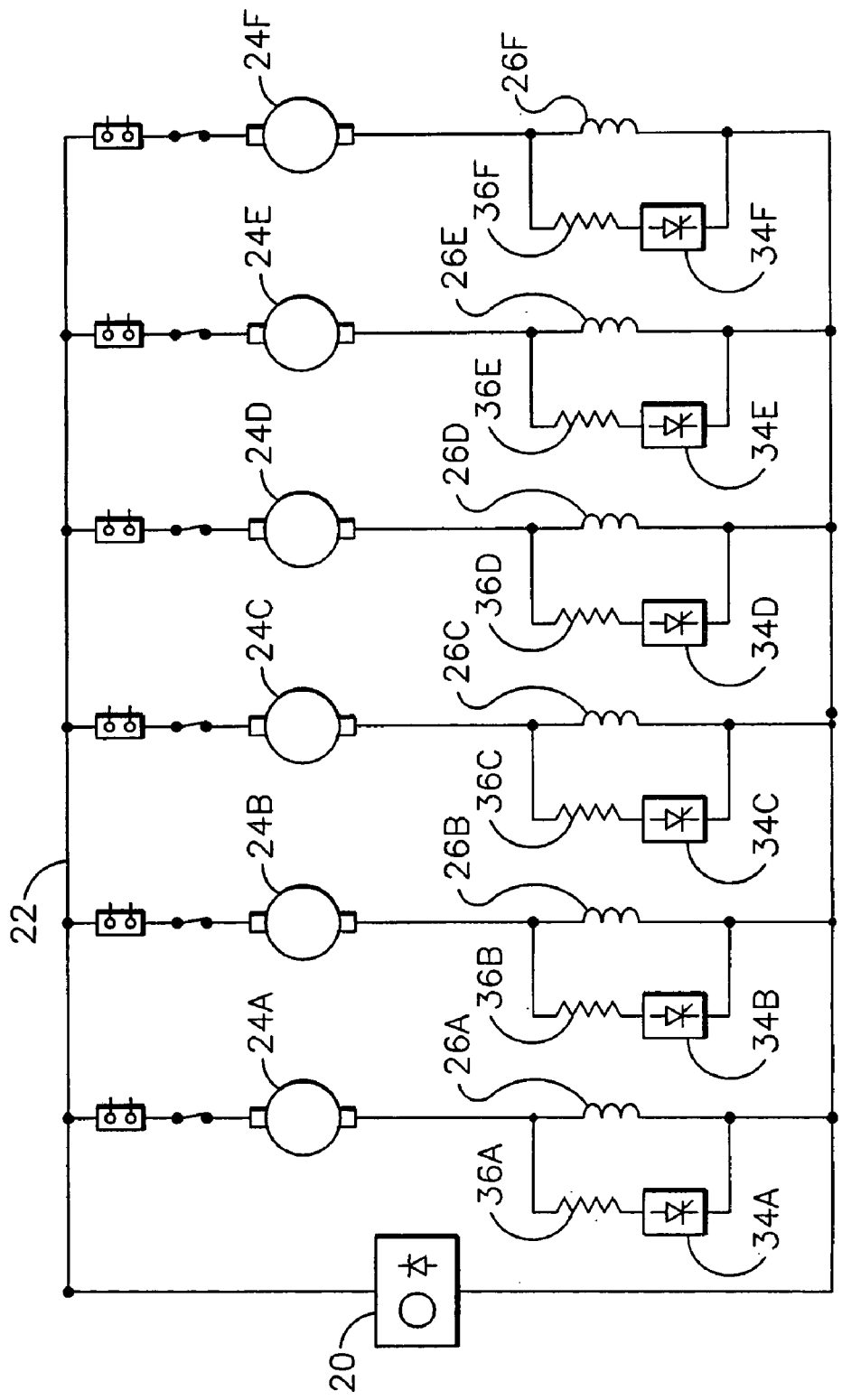
FIG. 4 is a modification of FIG. 2 using non-slipping wheel field shunting to correct wheel slip.

FIG. 4 shows still another embodiment of a wheel slip correction system that is operated in a manner to avoid power loss during normal locomotive operation. In this embodiment, each motor field winding 26A–26F includes a field shunt circuit comprising a controllable switching device 34A–34F in series with a current limiting resistor 36A–36F. In prior art systems such as U.S. Pat. No. 6,634,303, a switching device and series resistance are connected in parallel with a motor field and the switching device is normally conductive so that power is dissipated in the resistance during normal motor operation, i.e, when an associated wheel is not slipping. The system of FIG. 4 avoids this problem by maintaining the devices 34 in a non-conductive mode during normal, non-wheel slip conditions. Upon detection of a wheel slip, the devices 34 associated with each wheel except the slipping wheel are gated into conduction so that the torque or speed of the non-slipping wheels are increased while at the same time a reduction in excitation voltage on the DC bus is implemented. The effect is to maintain vehicle speed while allowing the slipping wheel to recover. Since wheel slip is a transient effect with the correction system, power dissipation in the resistors 36 is minimized.

Figure 6A:
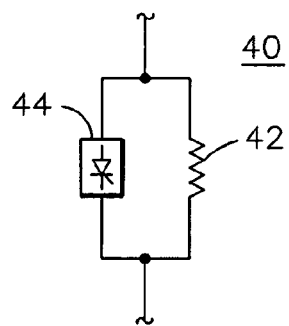
FIGS. 6A–6C illustrate embodiments of the voltage reduction apparatus of FIG. 5.
Figure 6B:
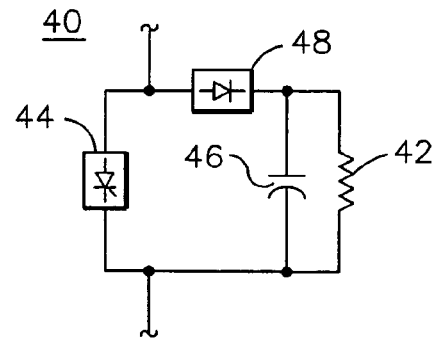
Figure 6C:
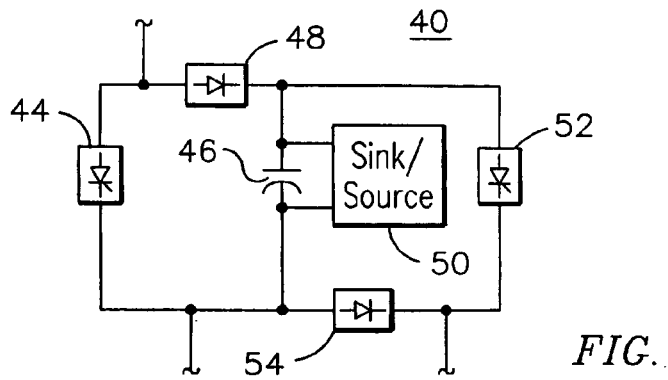
Figure 5:
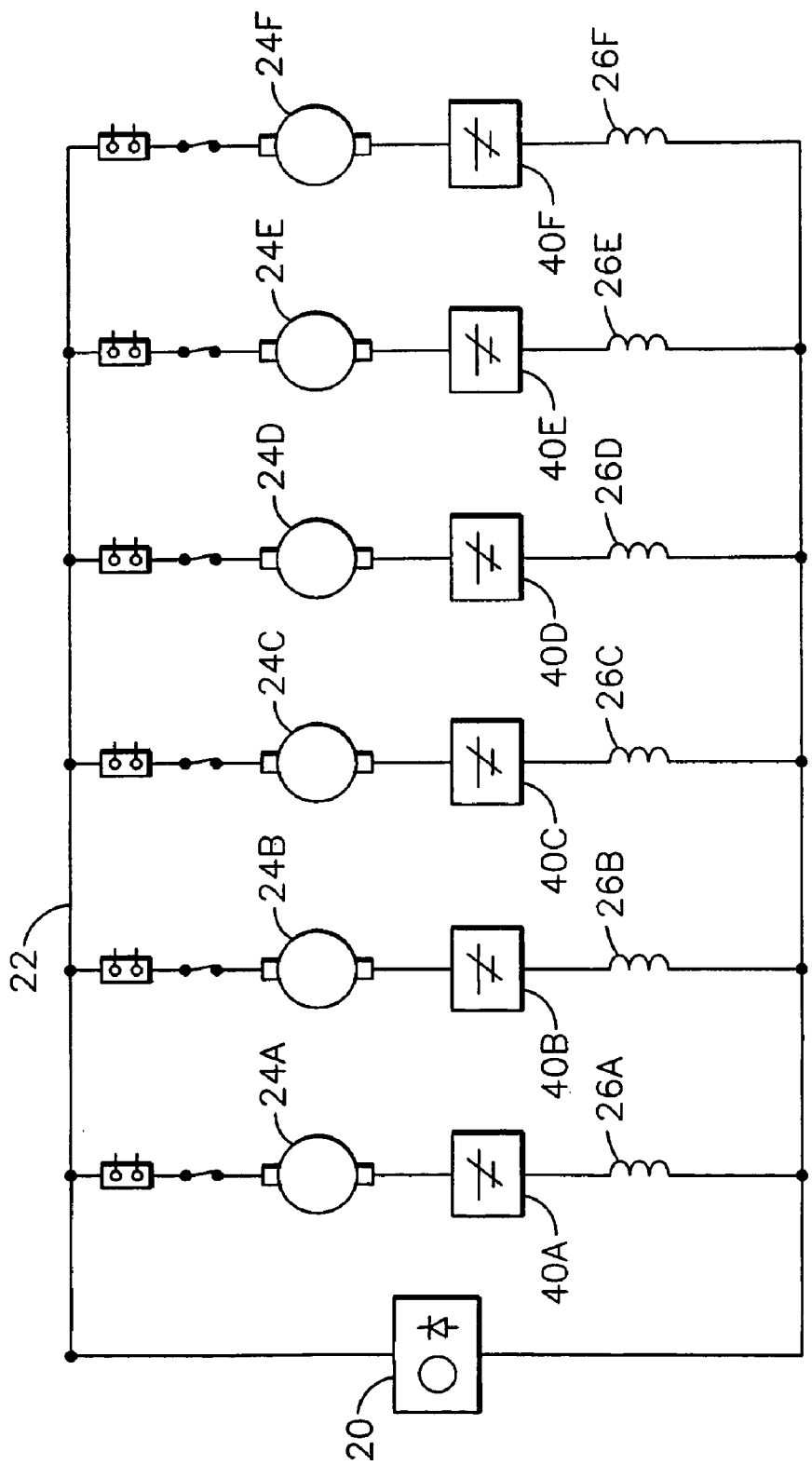
FIG. 5 is another embodiment using direct reduction of motor armature voltage without field shunting by inserting a voltage reduction apparatus in series with the armature.

FIG. 5 illustrates another embodiment of wheel slip correction using voltage adjustment in the armature circuit. A device 40A–40F is inserted in series with each motor 14 (shown between armature winding 24 and field winding 26 although it will be recognized that the device may be outside the motor). The devices 40 may take various forms, examples of which are shown in FIGS. 6A, 6B and 6C. Each device 40 is designed to reduce voltage applied to the motor armature so that motor current and torque are reduced so as to allow the wheel associated with the motor to regain adhesion and correct for wheel slip.

FIG. 6A illustrates a simple solution to reducing armature voltage by connecting a resistance 42 in series with the armature and power source. A switching device 44, such as a thyristor, is connected in parallel with resistance 42 and controlled to normally be conductive to allow current to bypass the resistance. Upon detection of a wheel slip, device 44 is switched out of conduction forcing current through the resistance. The resulting IR drop reduces the voltage on the armature to achieve the effect described above.

FIG. 6B is a modification of the device of FIG. 6A that incorporates a capacitor 46 in parallel with the resistance 42. A diode 48 is connected in series with the parallel combination of the resistance and capacitor. The switch 44 bypasses the diode and resistance-capacitor combination. When a wheel slip is detected, the switch 44 opens and the current diverts through the capacitor-resistance combination. The capacitor is selected so as to produce a high charge quickly to force a rapid reduction of armature voltage. The resistance provides a discharge path for the capacitor and could be controlled to dissipate the charge over a long time period.

Still another modification is shown in FIG. 6C in which the capacitor 46 is coupled to a separate charging source 50. Source 50 may be the vehicle battery or a separate winding on the vehicle alternator. This circuit allows the amount of armature voltage reduction to be controlled by the magnitude of charge on the capacitor and also eliminates the capacitor charging time to effect a faster response. FIG. 6C also includes a second switch 52 bypassing the capacitor and a second diode 54 in series with the switch 44. These two components allow the capacitor 46 to be charged with an opposite polarity to allow power to be inserted in series with the armature. It will be noted that while these systems are shown in relation to individual motors, in propulsion systems in which more than one motor is connected in parallel such as when all motors on one truck are controlled together, the device 40 could be used on a per truck rather than a per motor basis.

Figure 7:
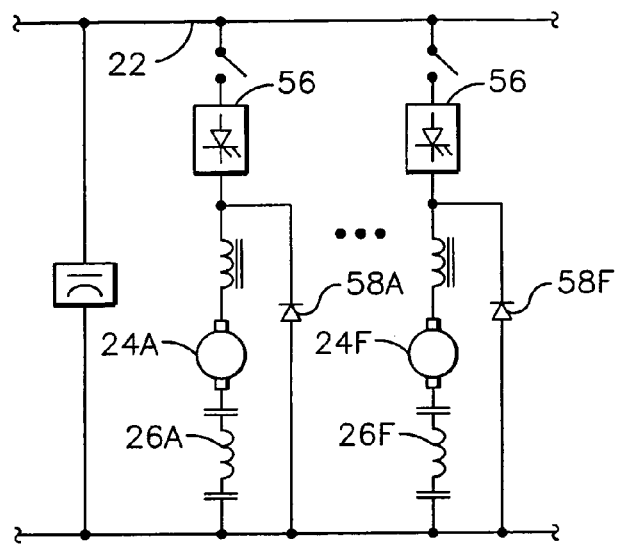
FIG. 7 illustrates use of a chopper circuit for motor armature voltage reduction for wheel slip correction.

FIG. 7 illustrates a system in which the device 40 is replaced by a chopper circuit 56 to control the voltage applied to each motor. The use of the chopper circuit requires the addition of the flyback diodes 58 to allow inductive current to continue through the motor when the chopper circuit is switched off.

Figure 8:
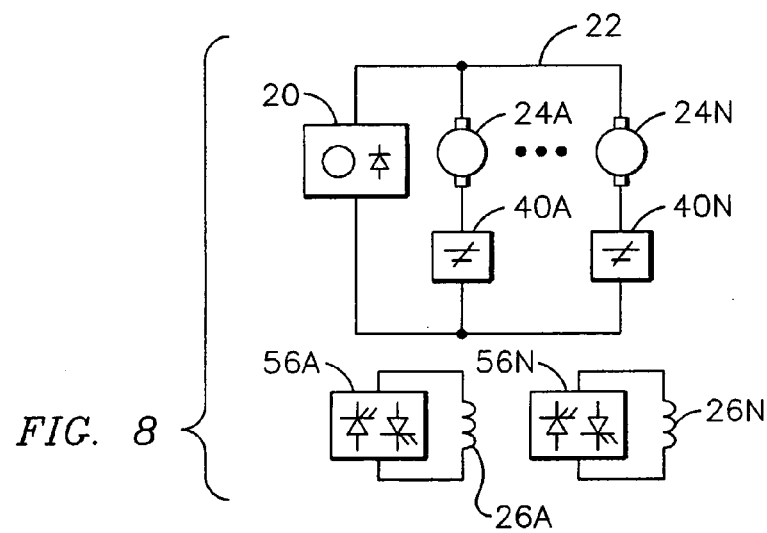
FIG. 8 illustrates use of the armature voltage apparatus of FIG. 5 as applied to a system having separate field control.
Figure 9:
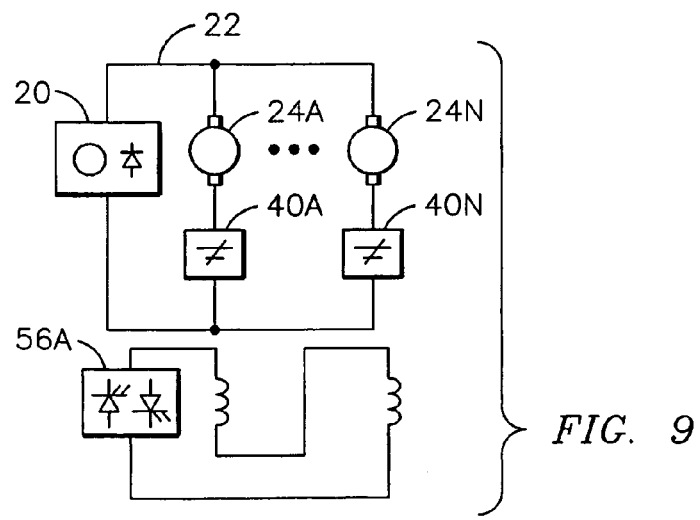
FIG. 9 is an illustration of the system of FIG. 8 in which all motor fields are in series and powered from a single control.

FIGS. 8 and 9 illustrate two embodiments of a series wound but separately excited DC motor in which the device 40 can be used to control armature current without changing field excitation. FIG. 8 shows a per motor control system while FIG. 9 shows a motor group control system. The advantage of FIG. 9 is that individual armature voltage can be controlled in a system in which multiple fields are powered from a single control unit. Any of the devices 40 of FIGS. 6A, 6B and 6C could be used in these embodiments. In both FIGS. 8 and 9, the armatures of multiple motors are connected in parallel to a single power source thus simplifying the motor control scheme.

While the various embodiments of the invention have been described with reference to a method for correcting for a wheel slip or wheel slide condition (wheel slide occurring when one or more of the wheels slide on a rail and turn slower as opposed to a wheel slip in which a wheel turns faster, the slide condition normally occurring when the system is in a braking mode), it will be recognized that the ability to control individual wheels in the various embodiments also allows for adjustment of the speed of each wheel so as to correct for wheel diameter differences. In other words, a wheel diameter difference may cause a smaller diameter wheel to always be in a slipping mode if the same torque is applied to that wheel as compared to a slightly larger diameter wheel. Since wheels may wear differently and some wheels may be changed without changing other wheels on the vehicle, there is often some slight difference in wheel diameter among the several wheels of a locomotive or similar type multi-axle driven vehicle. The system disclosed herein allows continual compensation for such wheel diameter differences just as though such differences were caused by wheel slippage due to load or loss of traction.

While the invention have been described in what is presently considered to be the preferred embodiments, various modifications will become apparent to those skilled in the art. Accordingly, it is intended that the invention not be limited to the specific disclosed embodiments but be interpreted within the full scope and spirit of the intended claims.

The invention claimed is:

1. A wheel slip correction system for an electric traction motor propelled vehicle, the vehicle having a plurality of DC electric traction motors each having a series connected armature and field winding, the system comprising:
   a plurality of DC electric traction motors each coupled in driving relationship to at least one wheel of the vehicle;
   an electric power source connected for supplying electric power to the series connected armature and field winding of each of the motors;
   a plurality of armature current adjusting circuits, each of the circuits being connected in circuit with a respective one of the motors for reducing motor armature current, when actuated, of at least a motor coupled to a wheel detected to be slipping, the apparatus being arranged to be non-power dissipative during non-wheel slip conditions.

2. The wheel slip correction system of claim 1 wherein the apparatus comprises a field boost circuit connected to the motor field winding, the field boost circuit comprising a controllable, unidirectional switching device and an inductor connected in an electrical series circuit in parallel with the motor field winding, the switching device being poled to increase motor field current when activated.

3. The wheel slip correction system of claim 1 wherein the apparatus comprises a field boost circuit connected to the motor field winding, the field boost circuit comprising a controllable, unidirectional switching device connected in current shunt relationship with at least a portion of the motor field winding, the switching device being poled to bypass field current from the at least a portion of the motor field winding during normal motor operation and to force current thereunto during slipping of the wheel associated with the motor.

4. The wheel slip correction system of claim 1 wherein the apparatus comprises a series combination of a controllable switching device and a resistor, each combination being separately controllable and connected in parallel with a respective one of the motor field windings, the system including a controller for actuating all switching devices not associated with a slipping wheel upon detection of a wheel slip of any other wheel.

5. The wheel slip correction system of claim 1 wherein the apparatus comprises a controllable impedance insertable in series circuit with each respective motor, the impedance being normally bypassed and insertable for reducing armature current in a motor coupled to a slipping wheel.

6. The wheel slip correction system of claim 5 wherein the impedance comprises a controllable switching device in parallel with a resistor.

7. The wheel slip correction system of claim 5 wherein the impedance comprises a capacitor in parallel circuit with the resistor.

8. The wheel slip correction system of claim 7 and including a unidirectional conducting device in series circuit with the parallel combination of resistor and capacitor.

9. The wheel slip correction system of claim 8 and including a charging circuit coupled to the capacitor such that a voltage is insertable in series with the motor armature upon detection of a wheel slip.

10. A wheel slip correction system for an electric traction motor propelled vehicle, the vehicle having a plurality of driven wheels, the system comprising:
    a plurality of DC electric traction motors each connected in driving relationship to at least one wheel of the vehicle;
    an electric power source for supplying DC electric power to each of an armature winding and a field winding of each motor; and
    apparatus connected in circuit with each armature winding and responsive to a wheel slip condition for reducing armature winding current in the motor coupled to the slipping wheel without increasing field winding current in such motor, the apparatus comprising a voltage source for inserting a reverse voltage in series with the armature winding and DC electric power source so as to reduce voltage applied to the armature winding.

11. The wheel slip correction system of claim 10 wherein the apparatus comprises a controllable switching device, a capacitor and series connected diode coupled in parallel circuit with the switching device and a charging source coupled to the capacitor, the switching device being switched to an open-circuit condition upon detection of a wheel-slip so as to apply a voltage on the capacitor in a series path with the armature winding to effect a reduction in voltage applied across the armature winding.

* * * * *